(12) United States Patent
Pomerantz et al.

(10) Patent No.: US 8,730,660 B2
(45) Date of Patent: May 20, 2014

(54) REMOTE ATTACHABLE FLASH DRIVE (75) Inventors: Itzhak Pomerantz, Kefar Sava (IL); Rahav Yairi, Oranit (IL); Eitan Mardiks, Ra'anana (IL); Erez Baum, Rehovot (IL)

(73) Assignee: Sandisk Technologies Inc., Plano, TX (US)

( * ) Notice: Subject to any disclaimer, the term of this patent is extended or adjusted under 35 U.S.C. 154(b) by 186 days.

(21) Appl. No.: 13/308,794

(22) Filed: Dec. 1, 2011

(65) Prior Publication Data
US 2012/0140401 A1 Jun. 7, 2012

Related U.S. Application Data (60) Provisional application No. 61/418,564, filed on Dec. 1, 2010.

(51) Int. Cl.
*G06F 1/16* (2006.01)

(52) U.S. Cl.
USPC ....... 361/679.32; 439/626; 382/154; 711/202

(58) Field of Classification Search
USPC ............ 439/607, 630, 638, 626, 620.21, 488, 439/181; 604/890.1; 382/313, 305, 100, 382/229, 154; 361/679.32, 679.33, 679.34, 361/679.39, 679.38, 679.47, 679.01, 361/679.02; 711/103, 162, 154, 173, 114, 711/115, 202; 345/520, 163, 173, 629, 204, 345/55

See application file for complete search history.

(56) References Cited

U.S. PATENT DOCUMENTS

| | | |
|---|---|---|
| 4,164,085 A | 8/1979 | Steeb et al. |
| 4,453,743 A | 6/1984 | Sanders et al. |
| 5,036,472 A | 7/1991 | Buckley et al. |
| 5,513,116 A | 4/1996 | Buckley et al. |
| 5,546,316 A | 8/1996 | Buckley et al. |
| 5,559,714 A | 9/1996 | Banks et al. |
| 5,561,604 A | 10/1996 | Buckley et al. |
| 5,904,962 A | 5/1999 | Harding et al. |
| 5,993,048 A | 11/1999 | Banks et al. |
| 6,092,054 A | 7/2000 | Tackbary et al. |
| 6,153,311 A | 11/2000 | Springer et al. |
| 6,186,936 B1 | 2/2001 | Smith et al. |
| 6,349,639 B1 | 2/2002 | Smith et al. |
| 6,687,362 B1 | 2/2004 | Lindquist et al. |
| 6,873,971 B1 | 3/2005 | Tackbary et al. |
| 6,931,419 B1 | 8/2005 | Lindquist |
| 7,593,605 B2 * | 9/2009 | King et al. ................ 382/313 |
| 7,648,059 B2 | 1/2010 | Pavlu, Jr. et al. |
| 2002/0097259 A1 | 7/2002 | Marshall et al. |
| 2002/0152001 A1 | 10/2002 | Knipp et al. |
| 2002/0152137 A1 | 10/2002 | Lindquist et al. |

(Continued)

OTHER PUBLICATIONS

Recordable Storybooks for Kids & More, http://www.hallmark.com/online/in-stores/storybooks/recordable-storybooks/?mc=T_S_G . . . , printed Dec. 1, 2011, 3 pages.

(Continued)

*Primary Examiner* — Hung Duong
(74) *Attorney, Agent, or Firm* — Toler Law Group, PC (57) ABSTRACT

A sticky drive includes a flash storage device and a mounting structure having a stickable surface. The mounting structure is coupled to the flash storage device to enable a user to attach the flash storage device to a user-selected object.

20 Claims, 8 Drawing Sheets

(56) References Cited

U.S. PATENT DOCUMENTS

| | | | |
|---|---|---|---|
| 2003/0018553 | A1 | 1/2003 | Lindquist |
| 2004/0085360 | A1 | 5/2004 | Pratt et al. |
| 2005/0085129 | A1* | 4/2005 | Chiou et al. ............ 439/607 |
| 2006/0079133 | A1* | 4/2006 | Kim ......................... 439/630 |
| 2007/0239139 | A1* | 10/2007 | Weston et al. .......... 604/890.1 |
| 2010/0052306 | A1 | 3/2010 | Teicher |
| 2010/0307036 | A1 | 12/2010 | Lien et al. |
| 2010/0308981 | A1 | 12/2010 | Lien et al. |
| 2011/0046961 | A2 | 2/2011 | Lien et al. |

OTHER PUBLICATIONS

Digistrip Fastener-USB, http://issichattanooga.com/store/product2379.html, printed Nov. 30, 2010, 1 page.

File-IT—Accessories—The Tube Clip, http://www.fileit.com.au/tube_clips.asp, printed Nov. 30, 2010, 1 page.

"HP Unveils Revolutionary Wireless Chip that Links the Digital and Physical Worlds," HP Press Release, http://www.hp.com/hpinfo/newsroom/press/2006/060717a.html, Jul. 17, 2006, 2 pages.

Jacobs, Andy, Wisair Wireless USB AudioNideo Adapter—The Gadgeteer, http://the-gadgeteer.com/2010/07/05/wisair-wireless-usb-audiovideo-adapter/ . . . , Jul. 5, 2010, 10 pages.

SanDisk Cruzer USB Flash Drive—16GB, http://www.google.com/products/catalog?q=sandisk +cruzer&hl=en&rlz=1T4GGLL_enIL . . . , printed Dec. 1, 2010, 3 pages.

USB Over Powerline Technology, Remote USB Technology—Icron Technologies, http://www.icron.com/products/usb_new/usb-over-powerline-extenders.php, printed Dec. 1, 2010, 1 page.

Tittel, Ed "Viz Vista—Thoughts, Tips, Tricks and Tweaks on and Around Windows Vista," http://viztaview.wordpress.com/2009/07/28/supertalent-pico-mini-8-gb-ufd-hits-several-int . . . , Jul. 28, 2009, 3 pages.

USB to Ethernet Connector for Windows, http://www.virtualserialport.com/products/usb-over-network/ . . . , printed Dec. 1, 2011, 2 pages.

\* cited by examiner

Prior art

REMOTE ATTACHABLE FLASH DRIVE

CLAIM OF PRIORITY

This patent application claims priority from U.S. Provisional Patent Application No. 61/418,564 filed Dec. 1, 2010, the contents of which is incorporated by reference herein in its entirety.

FIELD OF THE DISCLOSURE

The present disclosure is generally related to a sticky flash drive.

BACKGROUND

The need of organizations to store documents and physical objects in archives or storage rooms for future use is common in offices.

Since a big part of work today is done by computers, there is also a growing need to store digital data and many organizations have a local or a remote digital archives where such data is archived.

Presently, many organizations cannot do without both a physical storage room and a digital archive. As both the stored objects and the stored data refer to items of work in the organization (client records, patient records, cases, real estate asset documents, products, etc.), some or all work items are represented both in a physical carrier in the storage room and in a digital folder on a computer or on a mass storage device.

The fact that the content of a single item is split, with some overlap, between a physical folder and a logical (electronic digital) folder in two separate locations is a source of inconvenience, security risk and synchronization issues.

The need for a digital data storage that is physically glued to an associated object is partially satisfied by the technology known as RFID (Radio Frequency ID) where a small amount of data (e.g. less than 10 KB) is stored on a non volatile storage device that can be read and written using energy that is transmitted to the device from the reader. This technology is very useful in tagging products, where the amount of data to be stored is less than 100 bytes.

The need for a larger digital data storage that is physically glued to an associated object is partially satisfied by a product named "Memory Spot" described by HP corporation, California, USA, in "Memory Spot: A Labeling Technology" published by the IEEE, Pervasive Computing, IEEE, April-June 2010, Issue:2, pages 11-17, ISSN: 1536-1268. This technology uses a label that is a digital memory that stores a few megabytes of data and can be accessed wirelessly for writing and reading by bringing a reading device (wand) in close proximity to the label. This is, however, not a Flash memory device and there is no way to use this label as a drive, so it cannot be used as a mass storage device of several gigabytes. Moreover, the reader cannot be attached to the label for hands-free operation by a user after attachment, preventing a user from being able to work on his computer while maintaining a connection between the label and the wand. The memory spot product can be useful as an extension of RFID. These solutions do not provide a method to integrate the digital and physical data of an item into a single object.

It would be very good if there would be a simple, inexpensive and reliable way for a user to add to any given object the ability to store associated digital data in the same physical location, so that the complete information about a work item could be handled, stored, mobilized, accessed, written and read as a single entity.

Unfortunately, there is no such way to add digital storage capability to arbitrary objects using standard storage facilities and computer peripherals.

SUMMARY

A system and method are disclosed for a user to add digital storage capability to a physical object, unifying the location of the physical object and logical objects (typically digital data files) of a given item. One example includes unifying the location of official certificates, original documents, and machine printouts of patient records (all paper documents in a binder) with the test results, call summaries and scanned photographs of the patient (all in digital files in a mass-storage device) in one shelved binder. The data is stored in a mass storage device that has means to be attached by the user to the physical object and to be accessed by a conventional personal computer as a computer drive. The physical documents are stored in a standard binder that may stand on a shelf among other binders.

The mass storage device is physically attached by the user to the physical carrier so that the mass storage device and the physical carrier are practically un-separable, and the storage device is accessible by a computer while attached to the binder.

The communication between the mass storage device and the computer is done using a connectivity tool that communicates with the computer by a cable (e.g. Universal Serial Bus (USB) cable) or by wireless communication (e.g. Wi-Fi) or by a power line (e.g. PLC—Power line communication).

The mass storage device can be attached to the carrier during production or can be attached to the carrier by the user.

DETAILED DESCRIPTION

Figure 1:
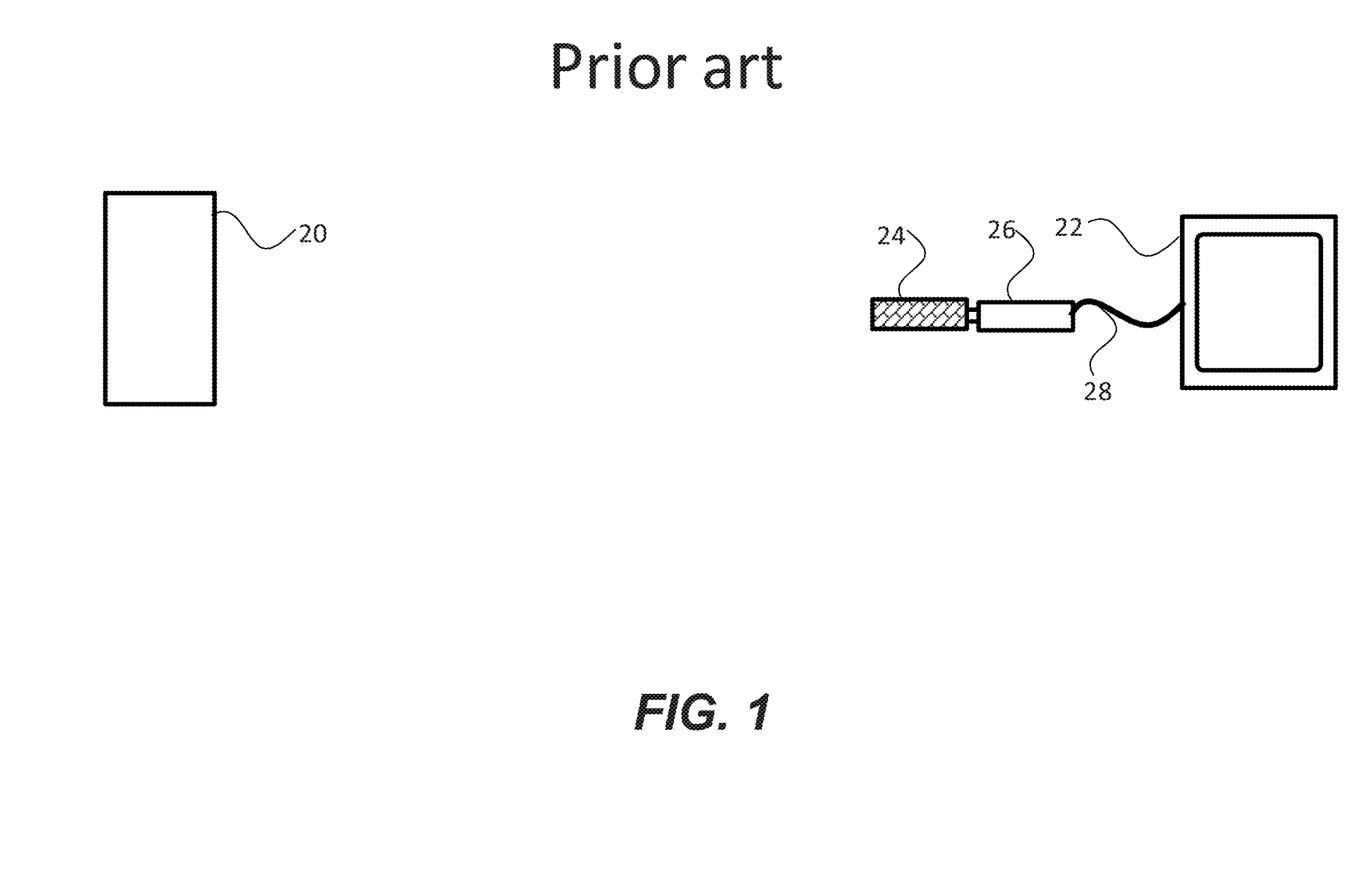
FIG. 1 shows a prior art system including a computer and an object.

FIG. 1 illustrates a prior art method of connecting a storage device 24 that is associated with an object 20 to a computer 22. There is not physical connection between the storage device and the object. The storage device, typically a flash drive or a memory card, is connected to a corresponding socket 26 (external on a cable or built in the wall of the computer) that is connected via a cable 28 (internal to the computer or external) to the computer.

Definitions of Terms:

The term "binder" is freely used in this application to refer to any solid physical object such as binders, books, museum items, crime-scene evidence and more.

Carrier—a physical object such as a book, a binder, and a museum item that is stored among many other objects in a storage room or archive.

Connectivity tool—a mechanical device that has means for detachable attachment to a storage device and contains mechanical means for stabilization and a connectivity module.

Connectivity module—the core of the connectivity tool that handles the remote side of the communication between the storage device and the host computer.

Work item—one of many items that are the subject of the work of an institute or organization, such as patient records, customer records, catalog items, books, subscribers etc.

Flash drive—a storage device of a computer that appears as a volume in the operating system's file system.

Stably attachable—a situation where one object is attached to another object and stays stable enough relative to it so that if the other object is moved or shaken the first object stays attached to the other object (like a leach on a body, or a clamp in a workshop).

Sticky—in this application, the term "sticky" is used in the sense of having a stickable surface that can be applied, by a user, to objects of choice—but also includes means to prevent sticking to an object unless a user wishes it to stick—such as a protective sheet that prevents the object from sticking until this protective sheet is removed by the user. This is differentiated from having a sticky surface that has already been glued to a carrier object. As used herein, a stickable object that has been affixed or adhered to another object is not any longer a "sticky" object. (Conventionally, a sticky flash drive would be pre-glued to the object during production, preventing the user from the freedom to decide if it will be glued, when will it be glued, where on the object will it be glued and how many flash drives will be glued along the life of the object.).

Figure 2:
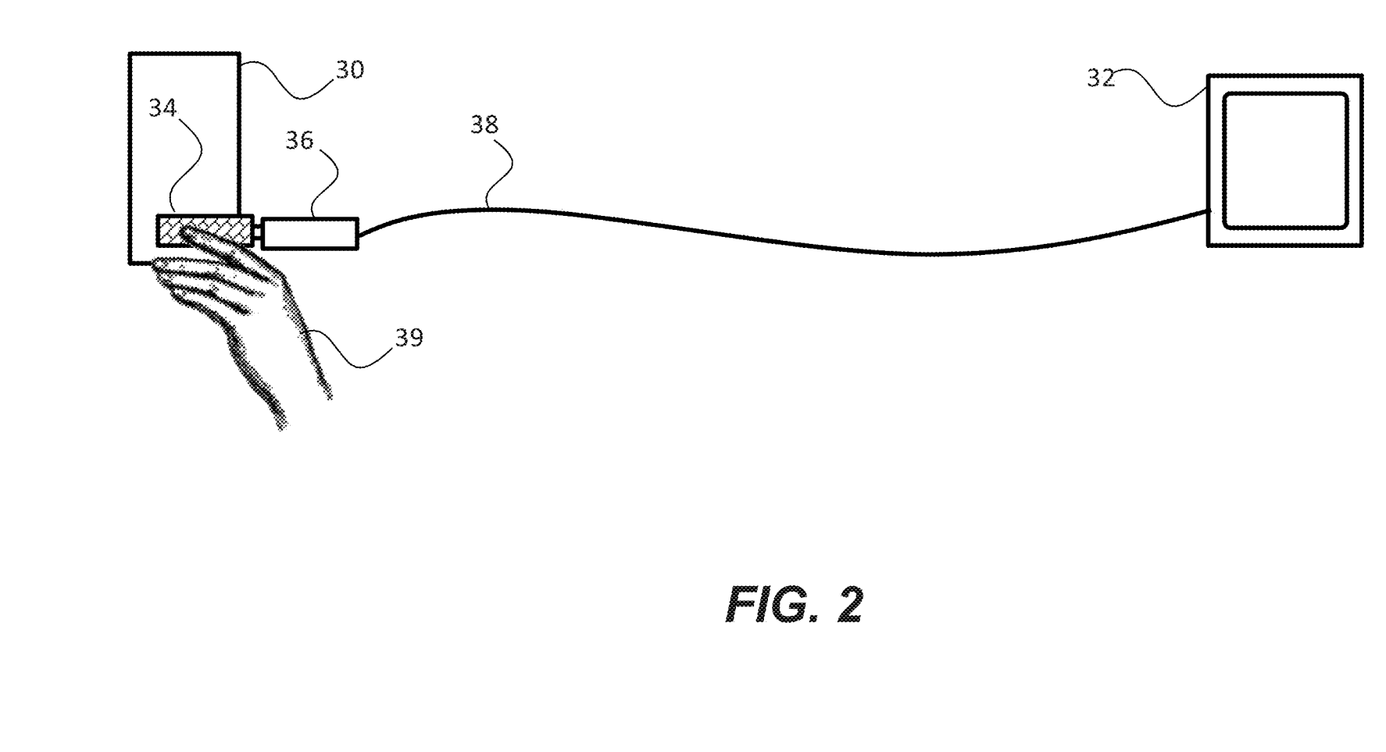
FIG. 2 shows a simple wired application of a particular embodiment.

FIG. 2 shows an embodiment where a flash drive 34, such as a SanDisk Cruzer® (trademark of SanDisk Corporation, Milpitas, Calif.) or a SanDisk microSD™ card (trademark of SD-3C LLC, Wilmington, Del.), is attached by a user 39 to an arbitrary associated object 30 by adhesion, and is typically remote from the computer 32. A socket 36, such as a USB female connector or a SanDisk MobileMate® card reader (trademark of SanDisk Corporation, Milpitas, Calif.) connected to a USB female connector, is plugged onto the storage device and a long cable 38 extends from the object 30 to the computer. The object can then stay in its storage place or it can be carried to the desk where the computer is located. The storage device remains glued to the object while written and read by the computer.

Figure 3:
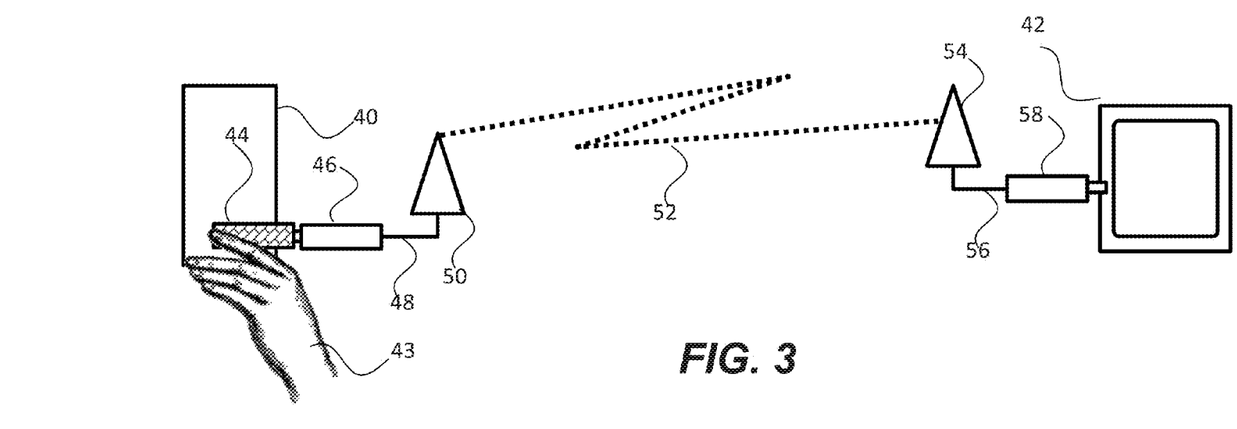
FIG. 3 shows a simple wireless application of a particular embodiment

FIG. 3 shows a storage device 44 glued by a user 43 to an associated object 40 and a socket 46 plugged onto the storage device. A wireless radio link comprising a remote transceiver 50, a local transceiver 54 and a radio wave 52, such as the Wisair "Wireless USB" device made by Wisair, Tel-Aviv, Israel, is connected to the socket 46 via a cable 48 or directly (the socket 46 can be built into the transceiver 50). The local transceiver 54 is connected to the computer 42 via a cable 56 and a plug 58 or is plugged directly into the computer. The computer accesses the storage device for reading and writing in the same way as in FIG. 2, but the wireless link replaces the cable 38. While this embodiment does not need a cable, it consumes energy at the remote end, may need batteries, and may have a limited work time. Alternatively, the wireless communication between the connectivity tool and the computer can be done by WIFI, using a software product as described by Eltima Software, Bellview Wash., USA. An advantage of using WIFI is that the object may be located remote from the computer and still communicate with the computer appearing as a conventional flash drive.

Figure 4:
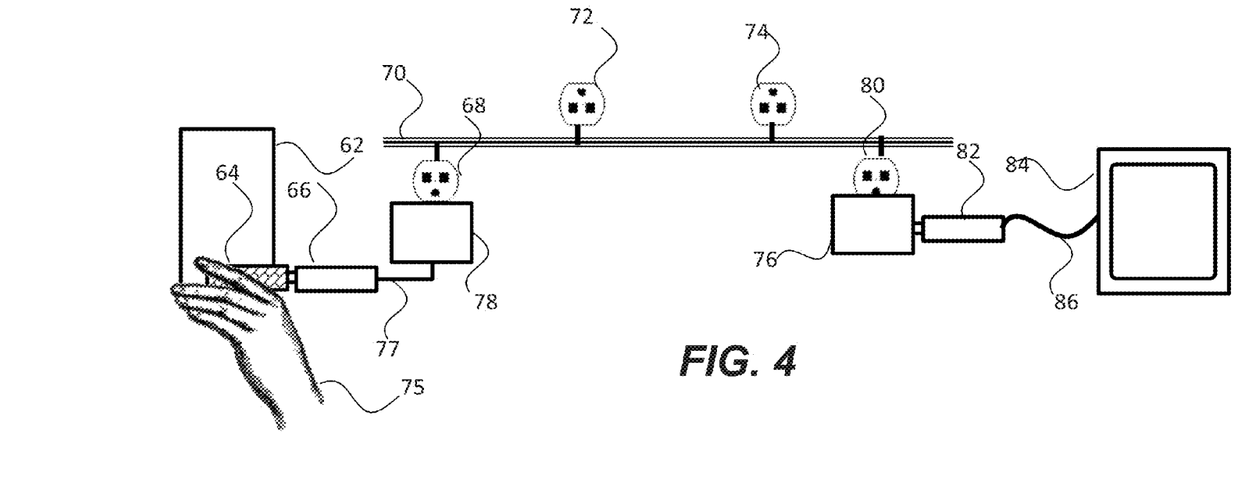
FIG. 4 shows a simple PLC implementation of a particular embodiment.

FIG. 4 shows an embodiment that avoids the physical cable of FIG. 1 and the battery consumption and limited range of FIG. 2. This is done using power line communication. The storage device 64 is glued by a user 75 to the associated object 62. A socket 66 is plugged onto the storage device. The socket is connected via a USB cable 77 to a power line communication modem 78 that has a USB interface, such as offered by Icron Technologies Corporation from Burnaby, British Columbia, Canada. Icron's USB over Power line technology integrates the ExtremeUSB® technology (trademark of Icron Technologies Corporation, Burnaby, British Columbia, Canada) and Power line communications (PLC) to provide remote USB 2.0 connectivity over standard AC power lines. It supports USB 1.1 (low-speed, full-speed) and USB 2.0 (high-speed) devices. It offers a plug-and-play connectivity with no new drivers required, it supports all major operating systems including Windows, MacOS and Linux. The PLC modem 78 plugs into an electric socket 68 near the object 62. Signals travel through AC power line 70 and reach socket 80 near the computer 84. Other AC sockets along the line 72, 74 can be used normally or can be connected to additional PLC modems. The local PLC modem 76 is plugged into the AC socket 80, and a USB cable 86 connects the USB socket of modem 76 using a USB plug 82 to the computer.

An advantage of this embodiment is that the distance between the object 62 and the computer 84 can be relatively long, and can be extended by PLC repeaters, and there is no need for batteries or charging at the remote end.

Figure 5A:
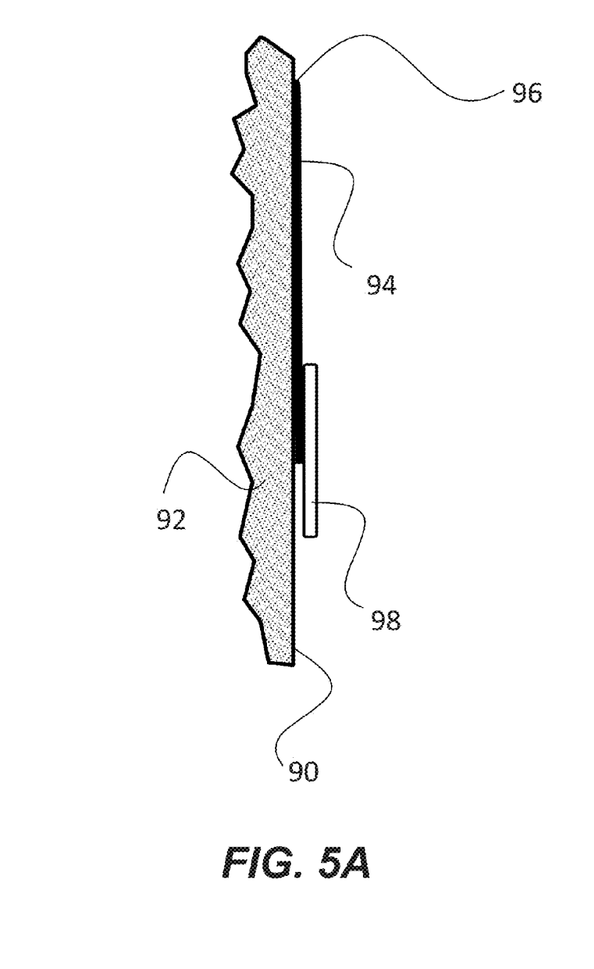
FIGS. 5A-5B show an embodiment of the storage device connection.
Figure 5B:
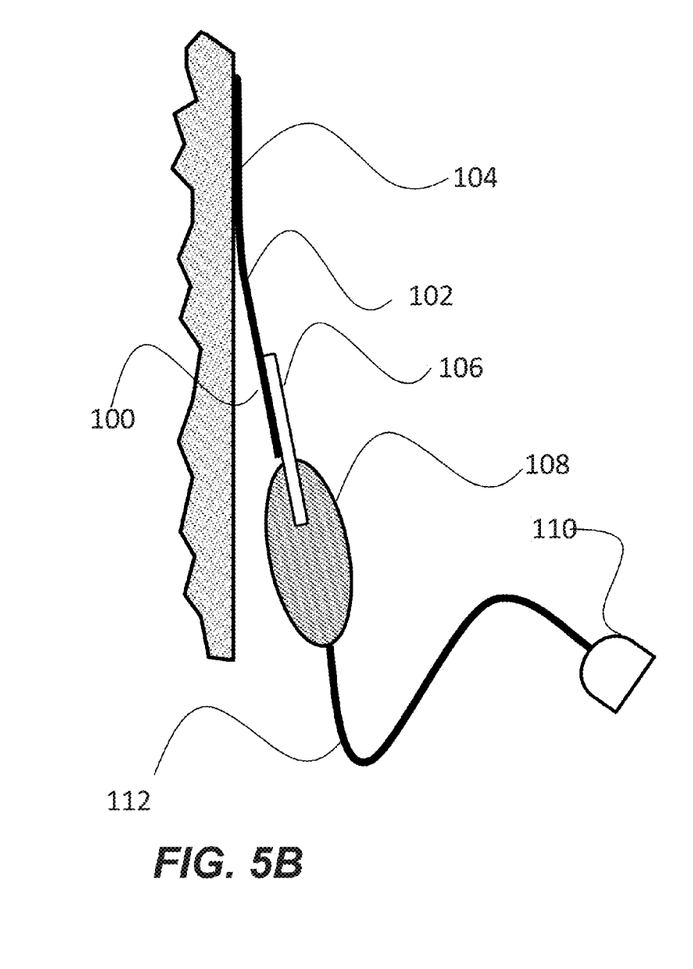

FIGS. 5A and 5B show a storage device 98, 106 such as the SanDisk microSD card, serving as the storage device in a particular embodiment. FIG. 5A shows the default state, where the storage device 98 is glued to an associated object 92 such as a book or a binder which is not in the vicinity of a computer. A mounting structure including a flexible tongue 94 such as a piece of polymer as used in standard credit cards is glued to the external side 90 of an object 92 using strong epoxy glue 96. The top part of the tongue 94 is glued to the object and the bottom part of the tongue 94 is free to bend outwards if a force is applied to it, and to return to its default position when the force is released.

FIG. 5B shows the same storage device 106 when a socket such as a SanDisk MobileMate reader 108 is plugged onto it. While the top part 104 of the tongue 102 remains firmly glued to the object, the bottom side 100 of the tongue is reversibly pulled away from the object in a spring action, to accommodate the reader 108. A cable 112 connects the reader to a USB plug 110 that can be connected in any of the embodiments shown in FIGS. 2-4—a long USB cable to the computer, a wireless USB adapter, or a PLC modem.

Figure 6A:
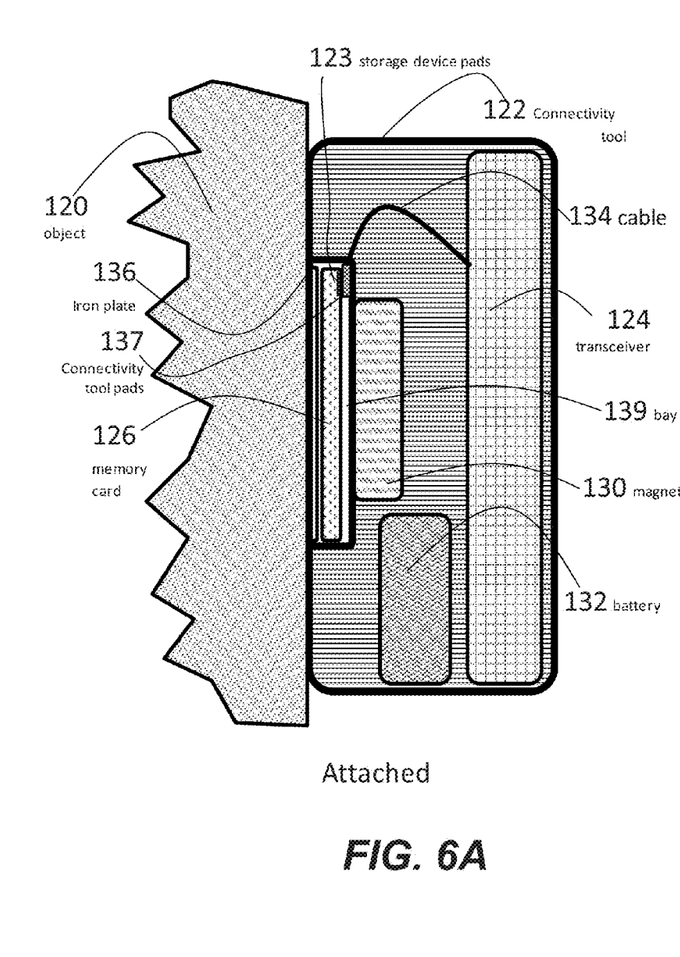
FIGS. 6A-6B show a magnetically attachable connectivity tool.

FIG. 6A shows an embodiment where the storage device 126 is attached to a solid object 120, such as a box, a sculpture, a forensic evidence item, a wall, etc.—such as in a vertical position. A connectivity tool 122 is attached to the storage device using a magnet 130 attracted to a metal plate 136. A mounting structure including a thin sheet of ferromagnetic material, such as a small iron plate 136, is glued to the storage device 126 on one side, and to the wall of the object 120 on its other side. The storage device, that can be a microSD card or a thin USB device such as the Super Talent or AMP 2 GB Wink micro pico USB Flash Drive available from Amazon.com, is glued so that its conducting pads 123 face outwards. A connectivity tool 122 embedding a strong magnet 130 is placed on the storage device, and the traction between the magnet 130 and the metal plate 136 holds it in place. A bay 139 giving a concave shape to the connectivity tool ensures accurate registration between the connectivity tool and the storage device, so that conductive leads 137 on the bay 139 of the connectivity tool can make good contact with the pads 123 of the storage device. The magnetic field easily passes through the body of the storage device 126 and keeps the connectivity tool stable in its position. Conductive, spring loaded leads 137 on the connectivity tool make good contact with the pads of the storage device. A cable (not shown) connects the leads of the connectivity tool to one of the connectivity modules mentioned in FIGS. 2-4—a long USB cable, a microSD card reader connected to a USB cable, a wireless transceiver or a PLC modem. In case the connectivity tool includes an internal wireless transceiver 124, a battery 132 is included in the connectivity tool and the leads are connected to the transceiver with an internal cable 134. The connectivity tool can easily be attached to any of many storage devices in the storage room or in the archive, and be easily detached from it to be moved to another storage device.

Figure 6B:
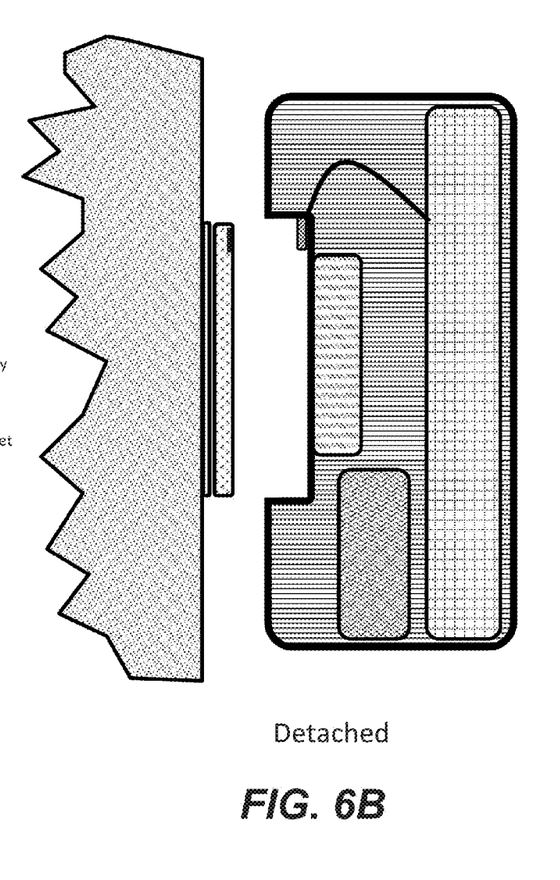

FIG. 6B shows the embodiment of FIG. 6A in its detached state, where the connectivity tool is not connected to the object.

Figures 7A, 7B:
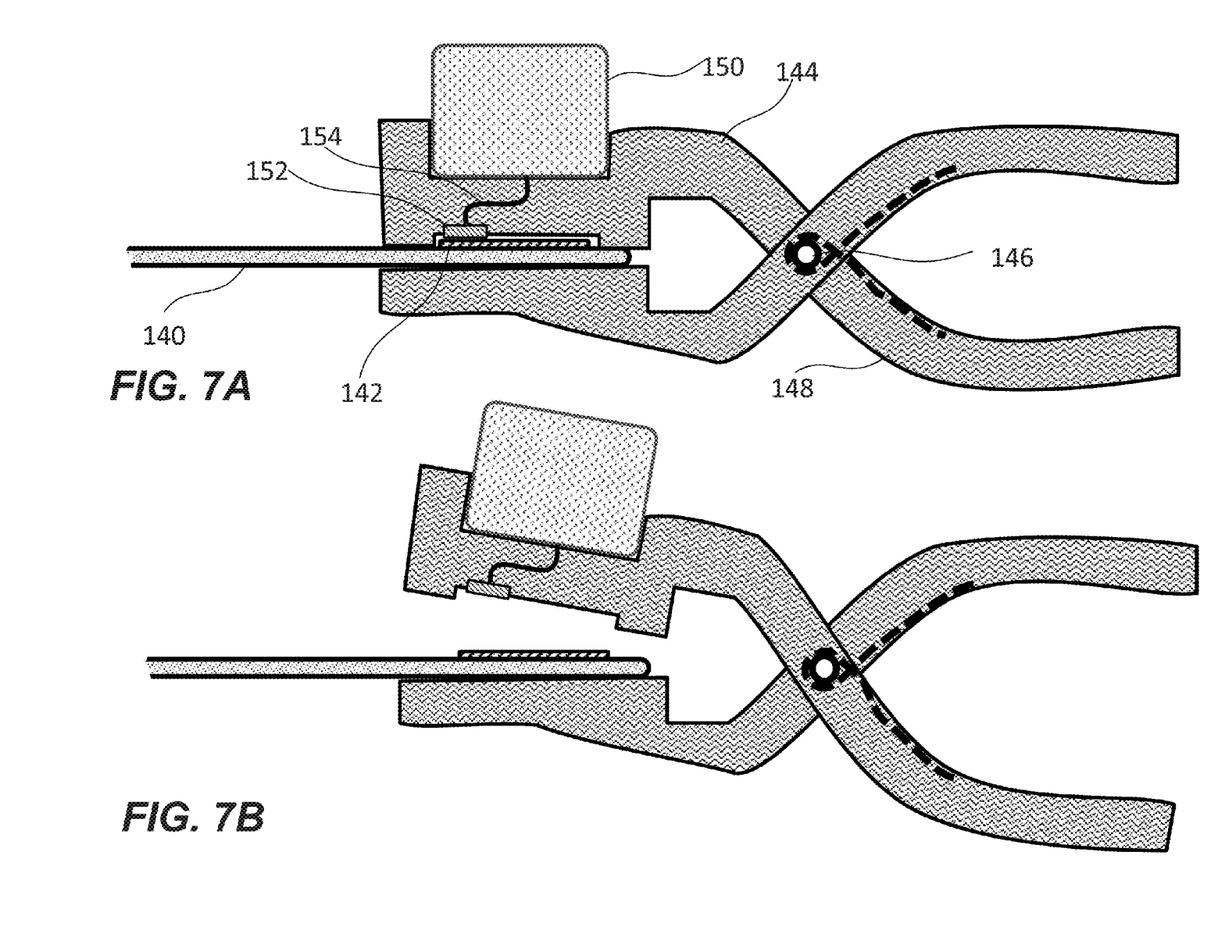
FIGS. 7A-7B show a clamped connectivity tool.

FIGS. 7A and 7B show an embodiment where a connectivity tool is attached to a flat surface by a clamping action.

A flat surface 140 such as the hard-cover of a book or an office binder carries a storage device 142 (of the same type as in FIG. 6) that is glued to it firmly, near the edge.

A spring loaded clamp 144, that is shown in FIG. 7A in its closed (active) position and in FIG. 7B in its open (not active) position, is clamped over the storage device, so that spring loaded conductive leads 152 are in contact with the conductive pad of the storage device. The leads 152 of the clamp are connected 154 to a connectivity module 150 that can be any of the types mentioned in FIG. 6. A strong spring 148 around the pivot 146 of the clamp holds the two jaws of the clamp tightly together, thus holding the clamp firmly in contact with the storage device.

This embodiment can be useful for using a storage device that is attached to books in a library or to binders in an archive room. The book or binder can be carried to the area of the computer, and then a cable can be used, or the book or binder can be left on the shelf and then the wireless USB adapter can be used, or the book or binder can be taken near an AC socket in the archive room, and then a PLC modem can be used.

Figure 8:
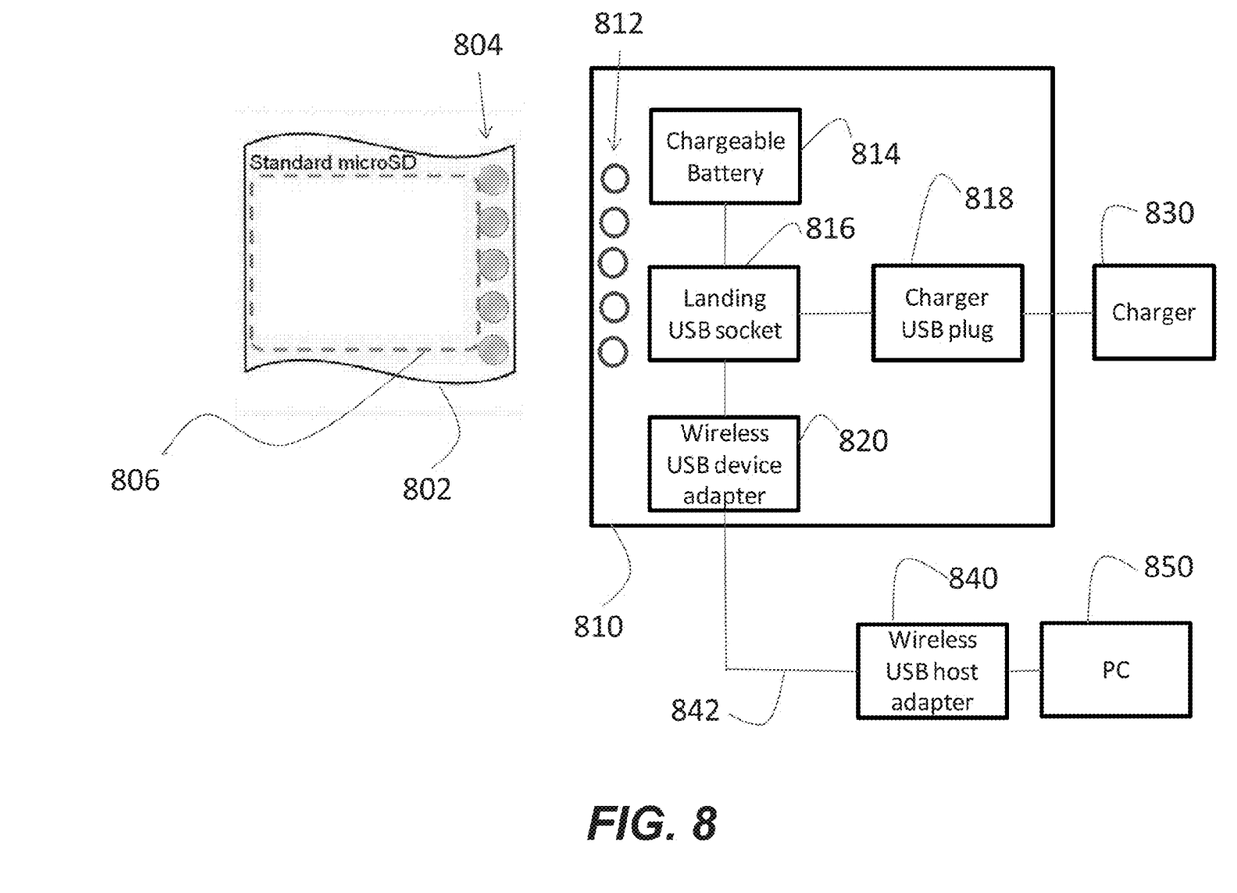
FIG. 8 shows an embodiment of a system including a sticky drive and a connectivity tool.

FIG. 8 shows a particular embodiment of a system including a sticky drive 802 coupled to a connectivity tool 810. The sticky drive 802 includes electrical contacts or pads 804 to enable communication with a storage device 806, such as a standard microSD flash memory card. The connectivity tool 810 includes electrical contacts or pads 812 configured to connect to the pads 804 of the sticky drive 802. The connectivity tool 810 includes a chargeable battery 814, a landing USB socket 816, a charger USB plug 818, and a wireless USB device adapter 820. The charger USB plug may enable charging the chargeable battery 814 via coupling to an external charger 830. The wireless USB device adapter 820 may enable communication with a host device, such as a personal computer (PC) 850 via wireless signaling 842 with a wireless USB host adapter 840.

The connectivity tool 810 may include a concave feature, such as a socket or cavity, that is shaped to receive insertion of the sticky drive 802 (which may have a distinctive contour). The concave feature may enable alignment of the pads 812 with the pads 804 of the sticky drive, such as described with respect to FIG. 5.

Figure 9:
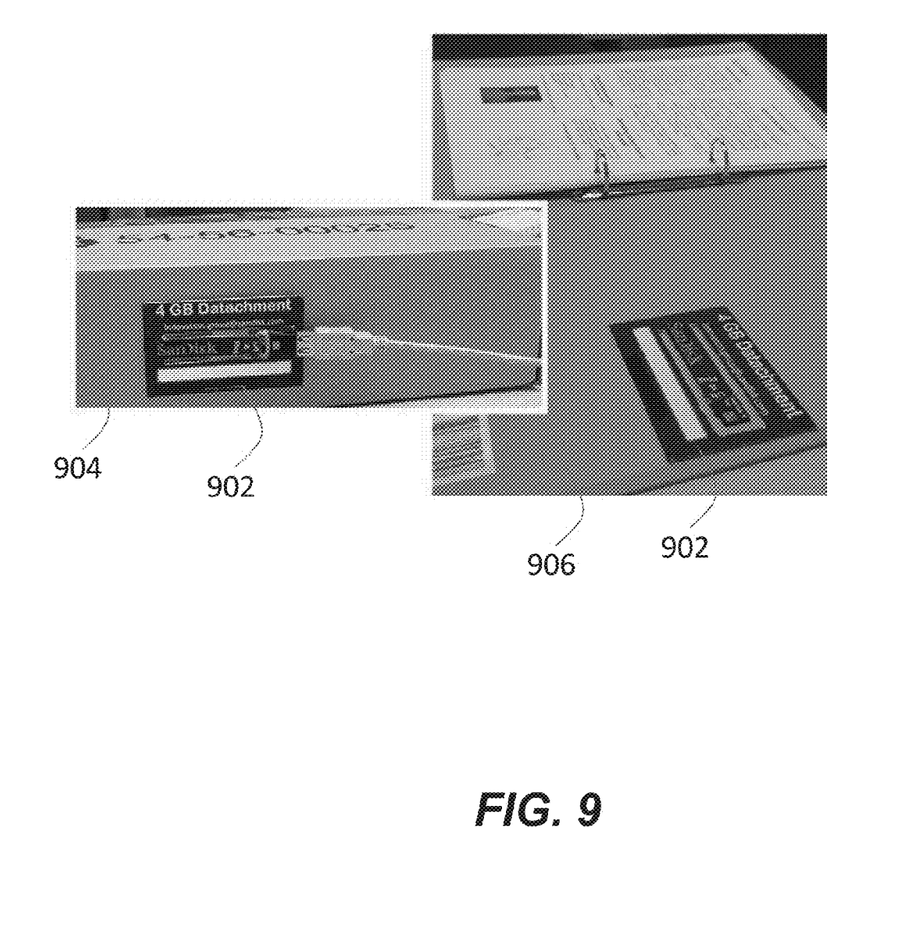
FIG. 9 shows an embodiment of a sticky drive.

FIG. 9 shows an implementation of a sticky drive 902. The sticky drive 902 is depicted in one embodiment after attachment by a user to a package 904 and coupled to a connectivity tool. The sticky drive 902 is depicted in another embodiment after attachment by a user to a notebook 906. The sticky drive includes a mounting structure having flexible tongue, such as described with respect to FIGS. 5A-5B to enable attachment of a card reader portion of the connectivity tool.

A plurality of small, permanently adhesive mass storage devices may therefore be fixed to physical objects at home, in the office or in industrial environments and function while connected to the object, and contain a large amount of data. A wireless connectivity module can be optionally attached to the storage memory device while it is fixed to the object, and present the storage memory device to a local host as an ordinary drive on a computer.

Thus, both wired versions and wireless versions of the disclosed systems are described. In an illustrative wired version, when a user needs to write or read data into or from the binder, he can bring the binder to his desk, connect a cable from the computer to the device in the binder, and operate the device as a drive on his computer. In an illustrative wireless version, when the user needs to access data from a binder, the user can take a connectivity tool from his desk, go to where the binder is, and attach the connectivity tool to the storage device by clamping or by hanging it over the connector. By the time the user is back at his desk, the storage device can be already open as a drive on the user's PC.

This can be achieved by a substantially instant, yet stable, mechanical connection between the connectivity module and the storage device and a wireless connectivity between the connectivity module and the PC. A mass storage device can be fixed by the user (and not ex-factory) to an arbitrary object, so that the mass storage device can operate while attached to the object. According to the wireless option, the mass storage device can communicate without a wired connection to the host. The communication between the connectivity module and the host can be Bluetooth, wireless, WiFi, infrared (IR), cellular etc.

Several benefits to the user may result from the data remaining physically attached to a physical object via use of a sticky drive:

Security: when the object is in the safe, so is the data, such as the secret data of a secret case.

Data portability: wherever the object goes, the data automatically goes with it, such as legal data attached to a client's file on the way to court.

Order: data cannot be lost, as long as the physical object is in place, such as a book on a shelf.

Chain of evidence: if the object has not been accessed, the data has not been tampered, such as crime evidence.

Archiving: an unlimited number of storage devices can be accessed with a single connectivity module.

Mobility: the connectivity module can be equipped with a cellular modem, and enable direct communication of data from the storage device to any mobile phone. The access control may be performed by a low-tech method—data is only accessed if a human operator physically attaches the connectivity module to the storage device.

Parallel paper/digital reading: the reader can read the book on paper and look at the appendix on the screen, simultaneously.

Billing: the memory device attached to a book can monitor and bill the user for the data extracted. The user can be charged when returning the book to the librarian.

In conjunction with the disclosed embodiments, a sticky flash drive can operate away from a computer. In a particular implementation, a sticky flash drive is connected to a computer via a cable. In another implementation, a sticky flash drive is connected to a computer wirelessly. In yet another implementation, a sticky flash drive is connected to a computer via a PLC modem.

For example, a sticky drive may include a flash storage device and a mounting structure having a stickable surface, the mounting structure coupled to the flash storage device to enable a user to attach the flash storage device to a user-selected object. The drive may be produced having a sticky surface. However, in other implementations, the surface may not be sticky from production and instead the mounting structure can have a surface where the user may apply an adhesive to the surface as a part of the application of the drive. The surface would then become sticky, if only for a brief duration between the application of the adhesive and the application of the drive. In other implementations, the surface may be not sticky at all, such as if the user applies the adhesive to the object (and not to the drive) and then attaches the drive to the sticky object.

The flash storage device may be coupled to a flexible tongue of the mounting structure and, after the stickable surface has been attached to the user-selected object, the flexible tongue can be flexed to move the flash storage device from a default position to a position further from the user-selected object. The mounting structure may include a magnetic material and electrical contacts coupled to the flash storage device may be positioned to couple to corresponding conductive leads of a connectivity tool while the connectivity tool is magnetically coupled to the sticky drive.

A user may couple the sticky drive to a computer to read data from the sticky drive or to write data to the sticky drive. For example, the sticky drive may be coupled to a computer via a cable. As another example, the sticky drive may be coupled to a computer wirelessly. As another example, the sticky drive may be coupled to a computer via a power line communication (PLC) modem.

An extended microSD reader may include a microSD card permanently attached to a USB cable. In a particular embodiment, a connectivity tool to enable communication between a flash drive and a computer includes a flash memory card reader terminating with a universal serial bus (USB) plug. The connectivity tool also includes a USB extension cable. The USB extension cable is fixedly attached to the flash memory card reader to enable at least one of sending data to a flash memory card and receiving data from the flash memory card while the flash memory card is operatively coupled to the flash memory card reader. For example, the USB extension cable may be designed to be non-removable by typical use from the flash memory card reader.

A method can include connecting a standard USB male plug to the printed board of a standard USB female socket, by a motion that is essentially vertical to the pad plane of both connectors (while the standard way of connecting them is sliding the male plug into a socket which in certain circumstances may be safer and/or more accurate, but requires the whole plug body to enter into the socket and, and is therefore not practical when the plug has to be glued to a non-standard object that cannot enter the socket). For example, a method may include connecting a universal serial bus (USB) male plug having a first set of pads to a printed board of a USB female socket having a second set of pads. A first pad plane substantially corresponds to the first set of pads and a second pad plane substantially corresponds to the second set of pads. Connecting the USB male plug to the USB female plug is performed by bringing the first set of pads in contact with the second set of pads via a motion in a direction that is substantially perpendicular to the first pad plane and to the second pad plane. To illustrate, the USB male plug may be connected to the USB female plug by applying a force in a direction that is perpendicular to the first pad plane and to the second pad plane.

A connectivity tool (see definition) is disclosed that is functionally stably attachable to a storage device using a magnet. A connectivity tool is disclosed that is functionally and stably attachable to a storage device using a spring action clamp. A connectivity tool is disclosed that is functionally stably attachable to a storage device via static mechanical coupling. A connectivity tool is disclosed where the mechanical coupling is based on friction.

In a particular embodiment, a connectivity tool to enable communication between a storage device of a sticky device and a computer includes multiple conductive leads positioned to contact corresponding electrical contacts of the storage device when the connectivity tool is removably attached to the storage device. The connectivity tool may also include a connectivity module configured to enable data communication between the storage device and the computer. The connectivity tool may include a magnet operative to magnetically attach the connectivity tool to a magnetic or ferromagnetic material that is coupled to the storage device. The connectivity tool may include a clamp operative to attach the connectivity tool to the storage device. The clamp may be spring-biased to maintain an attached configuration with the storage device. The connectivity tool may be functionally stably attachable to the storage device via static mechanical coupling. The static mechanical coupling may be based on friction. The connectivity module may include a universal serial bus (USB) cable.

The connectivity module may include a memory card reader coupled to a universal serial bus (USB) cable. The memory card reader may be compliant with a microSD memory card standard. The connectivity module may include a wireless transceiver. The connectivity module may include a power line communication (PLC) modem.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A sticky drive comprising:
    a flash storage device; and
    a mounting structure having a stickable surface, the mounting structure coupled to the flash storage device to enable a user to attach the flash storage device to a user-selected object.

2. The sticky drive of claim 1, wherein the flash storage device is coupled to a flexible tongue of the mounting structure and wherein, after the stickable surface has been attached to the user-selected object, the flexible tongue can be flexed to move the flash storage device from a default position to a position further from the user-selected object.

3. The sticky drive of claim 1, wherein the mounting structure includes a magnetic material and wherein electrical contacts coupled to the flash storage device are positioned to couple to corresponding conductive leads of a connectivity tool while the connectivity tool is magnetically coupled to the sticky drive.

4. The sticky drive of claim 1, wherein the sticky drive is coupled to a computer via a cable.

5. The sticky drive of claim 1, wherein the sticky drive is coupled to a computer wirelessly.

6. The sticky drive of claim 1, wherein the sticky drive is coupled to a computer via a power line communication (PLC) modem.

7. A connectivity tool to enable communication between a flash drive and a computer, the connectivity tool comprising:
- a flash memory card reader terminating with a universal serial bus (USB) plug;
- a universal serial bus (USB) extension cable fixedly attached to the flash memory card reader to enable at least one of sending data to a flash memory card and receiving data from the flash memory card while the flash memory card is operatively coupled to the flash memory card reader; and
- a clamp to operatively couple the flash memory card to the flash memory card reader.

8. The connectivity tool of claim 7, wherein the USB extension cable terminates with a USB plug configured to attach to the computer.

9. A connectivity tool to enable communication between a storage device of a sticky drive and a computer, the connectivity tool comprising:
- multiple conductive leads positioned to contact corresponding electrical contacts of the storage device when the connectivity tool is removably attached to the storage device; and
- a connectivity module configured to enable data communication between the storage device and the computer,
- wherein the connectivity tool is functionally and stably attachable to the storage device via static mechanical coupling.

10. The connectivity tool of claim 9, further comprising a magnet operative to magnetically attach the connectivity tool to a magnetic or ferromagnetic material that is coupled to the storage device.

11. The connectivity tool of claim 9, further comprising a clamp operative to attach the connectivity tool to the storage device.

12. The connectivity tool of claim 11, wherein the clamp is spring-biased to maintain an attached configuration with the storage device.

13. The connectivity tool of claim 9, wherein the static mechanical coupling is based on friction.

14. The connectivity tool of claim 9, wherein the connectivity module includes a universal serial bus (USB) cable.

15. The connectivity tool of claim 9, wherein the connectivity module includes a memory card reader coupled to a universal serial bus (USB) cable.

16. The connectivity tool of claim 15, wherein the memory card reader is compliant with a microSD memory card standard.

17. The connectivity tool of claim 9, wherein the connectivity module includes a wireless transceiver.

18. The connectivity tool of claim 9, wherein the connectivity module includes a power line communication (PLC) modem.

19. A method comprising:
- connecting a universal serial bus (USB) male plug having a first set of pads to a printed board of a USB female socket having a second set of pads,
- wherein a first pad plane substantially corresponds to the first set of pads and wherein a second pad plane substantially corresponds to the second set of pads, and
- wherein connecting the USB male plug to the USB female socket is performed by bringing the first set of pads in contact with the second set of pads via a motion in a direction that is substantially perpendicular to the first pad plane and to the second pad plane.

20. The method of claim 19, wherein the first set of pads is maintained in contact with the second set of pads via a connectivity tool.

* * * * *